(12) United States Patent
Meggiolan (10) Patent No.: US 10,502,274 B2
(45) Date of Patent: Dec. 10, 2019

(54) BLEEDING VALVE, A HYDRAULIC FITTING AND A VENTING ASSEMBLY FOR A BICYCLE HYDRAULIC BRAKING SYSTEM

(71) Applicant: CAMPAGNOLO S.r.l., Vicenza (IT)

(72) Inventor: Mario Meggiolan, Creazzo (IT)

(73) Assignee: Campagnolo S.r.l., Vicenza (IT)

(*) Notice: Subject to any disclaimer, the term of this patent is extended or adjusted under 35 U.S.C. 154(b) by 0 days.

(21) Appl. No.: 15/785,648

(22) Filed: Oct. 17, 2017

(65) Prior Publication Data
US 2018/0106312 A1 Apr. 19, 2018

(30) Foreign Application Priority Data

Oct. 17, 2016 (IT) .................. 102016000103768

(51) Int. Cl.
*F16D 65/00* (2006.01)
*B60T 11/30* (2006.01)
(Continued)

(52) U.S. Cl.
CPC .......... *F16D 65/0043* (2013.01); *B60T 11/30* (2013.01); *B60T 17/222* (2013.01);
(Continued)

(58) Field of Classification Search
CPC .. F16D 65/0043; F16D 65/0068; B60T 11/30; B60T 17/222; B62L 3/023
(Continued)

(56) References Cited

U.S. PATENT DOCUMENTS 1,397,220 A * 11/1921 Lord .................. B67D 3/045
137/590
2,069,606 A * 2/1937 Louis .................. B60T 17/222
137/543.17
(Continued)

FOREIGN PATENT DOCUMENTS

CN 102431532 B 7/2014
DE 202016004080 U1 7/2016
(Continued)

OTHER PUBLICATIONS

Italian Search Report and Written Opinion in Italian Application No. 102016000103768, dated Jun. 9, 2017, with English translation.
(Continued)

*Primary Examiner* — Thomas J Williams
(74) *Attorney, Agent, or Firm* — Volpe and Koenig, P.C.

(57) ABSTRACT

An assembly for venting a bicycle hydraulic braking system. One portion of the assembly is bleeding valve for a bicycle hydraulic braking system, comprising a valve body rotatably insertable in a seat of a brake caliper that has an axial inner cavity in fluid communication with a fluid cavity in the caliper and a closing body configured to removably held it in the axial cavity. A second portion of the assembly is a hydraulic fitting for venting the braking system. The hydraulic fitting has a fastening lip for a flexible tube, a portion to engage a tool, a portion configured to screw into a threaded cavity of the bleeding valve, and an axial passage through the fitting.

5 Claims, 5 Drawing Sheets

(51) Int. Cl.
    *B60T 17/22* (2006.01)
    *B62L 1/00* (2006.01)
(52) U.S. Cl.
    CPC .............. *B62L 1/00* (2013.01); *B62L 1/005* (2013.01); *F16D 65/0068* (2013.01)
(58) Field of Classification Search
    USPC ........... 188/352; 137/614.16, 614.17; 141/98
    See application file for complete search history.

(56) References Cited

U.S. PATENT DOCUMENTS

| | | | | |
|---|---|---|---|---|
| 2,519,569 | A * | 8/1950 | Hart | B60T 11/30 |
| | | | | 137/542 |
| 2,599,472 | A * | 6/1952 | Miller | F16N 21/06 |
| | | | | 184/105.3 |
| 2,611,387 | A * | 9/1952 | Legerski | B60T 17/222 |
| | | | | 137/270 |
| 5,960,922 | A * | 10/1999 | Riess | F15B 21/044 |
| | | | | 188/352 |
| 6,334,459 | B1 * | 1/2002 | Berger | B60T 17/221 |
| | | | | 137/198 |
| 7,412,829 | B2 | 8/2008 | Matsushita et al. | |
| 7,575,029 | B2 | 8/2009 | Robinson | |
| 7,744,097 | B2 | 6/2010 | Noguchi | |
| 8,186,921 | B2 * | 5/2012 | Lowman | F01M 11/0408 |
| | | | | 184/1.5 |
| 8,578,964 | B2 | 11/2013 | Maszull et al. | |
| 2003/0159440 | A1 | 8/2003 | Lavezzi | |
| 2006/0065498 | A1 | 3/2006 | Myers | |
| 2008/0053758 | A1 | 3/2008 | Ruckh et al. | |
| 2008/0060885 | A1 | 3/2008 | Ruckh et al. | |
| 2009/0038693 | A1 * | 2/2009 | Tokach | F16K 15/044 |
| | | | | 137/512 |
| 2009/0250118 | A1 * | 10/2009 | Zuck | F16K 24/04 |
| | | | | 137/181 |
| 2013/0068577 | A1 | 3/2013 | Kuan | |
| 2016/0347301 | A1 | 12/2016 | Gallagher | |
| 2017/0009833 | A1 | 1/2017 | Gallagher | |

FOREIGN PATENT DOCUMENTS

| | | |
|---|---|---|
| DE | 102016006447 A1 | 12/2016 |
| WO | 2006025075 A1 | 3/2006 |

OTHER PUBLICATIONS

European Office Action for European Application No. 17195844.0-1013, dated Oct. 4, 2019.
Magura RT8 brake Flow-To, dated Sep. 27, 2019. https://www.slowtwitch.com/Tech/Magura_RT8_brake_How-To_3490.html.

* cited by examiner

BLEEDING VALVE, A HYDRAULIC FITTING AND A VENTING ASSEMBLY FOR A BICYCLE HYDRAULIC BRAKING SYSTEM

CROSS REFERENCE TO RELATED APPLICATION

This application claims the benefit of Italian Application No. 102016000103768, filed on Oct. 17, 2016, which is incorporated herein by reference as if fully set forth.

FIELD OF INVENTION

The present invention generally relates to an assembly for bleeding a hydraulic braking system. More particularly, the present invention relates to a bleeding valve and a hydraulic fitting suitable for a bicycle hydraulic braking system, in particular for a racing bicycle.

BACKGROUND

As known, the use of disc brakes is now common in bicycles. Such brakes are, indeed, often preferred to conventional brakes of different design since they ensure a high braking force and are less subject to problems caused by mud or water.

Typically, a disc brake is part of a hydraulic braking system that comprises a caliper fixed onto the frame of the bicycle, a brake disc mounted on the hub of the wheel and a brake lever positioned on the handlebars.

Inside the caliper there are two or four pistons active on two opposite brake pads. The brake disc rotates inside the space defined between the opposite pads.

The brake lever is connected to the brake caliper by a flexible tube. The brake lever is equipped with a fixed portion firmly fastened to the handlebars and a mobile portion, usually a lever hinged to the fixed portion and actuatable by the cyclist.

Inside the fixed portion of the brake lever there is usually a main cylinder in which a piston moves for placing the hydraulic circuit under pressure when the cyclist actuates the mobile portion of the brake lever. The main cylinder thus actuates the pistons of the brake caliper that bring the pads towards one another, generating friction on the brake disc and, consequently, braking the wheel.

The brake liquid that flows inside the hydraulic braking system is incompressible, so as to immediately transmit hydraulic forces from the brake lever to the brake caliper.

Therefore, it is necessary to ensure that there is no air inside the braking system since, as it is highly compressible, it would compromise the correct operation of the system.

For this purpose, it is known to equip the hydraulic braking system with a bleeding valve that allows the air present in the system to be expelled. Such a bleeding valve is often also used to introduce brake liquid into the hydraulic system.

Usually, the bleeding valve is arranged on the brake caliper and comprises an internally hollow valve body inserted in a hole made in the brake caliper. The hole in the brake caliper is in fluid communication with the hydraulic circuit. By rotating the valve body inside the hole in the brake caliper, the inner cavity of the valve body is placed in fluid communication with the hydraulic circuit to allow the air expulsion and/or brake liquid insertion operations.

The inner cavity of the valve body has a lip on top that projects from the brake caliper and that is closed by a sealing element to prevent dust, mud or dirt to enter into the cavity of the valve body during normal use of the bicycle.

Such a lip allows a tube of flexible material to be coupled with the bleeding valve, so that the air can come out from such a tube or so that the brake liquid can be inserted into the system through it.

As stated, the bleeding valve is usually arranged on the brake caliper and, in particular, in a position such as to remain completely contained in the axial bulk of the brake caliper and facing the opposite way with respect to the ground.

In this way, the bleeding valve is not exposed to possible accidental knocks during use of the bicycle, even though the bleeding valve projects radially in a very pronounced manner from the brake caliper.

The Applicant has found that the maintenance operations carried out by acting on the bleeding valve are not always easy, since the axial distance between it and the wheel of the bicycle is quite small.

The Applicant has realized that a different position of the bleeding valve on the brake caliper, in particular axially distanced from the wheel, would make the maintenance operations carried out on the bleeding valve much easier, such as the venting of air and the insertion of brake liquid in the hydraulic braking system.

The Applicant has however found that such positioning of the bleeding valve could expose it to knocks and damage during normal use of the bicycle, especially in the case in which it projects from the axial bulk of the brake caliper.

SUMMARY

The present invention therefore relates, in a first aspect, to a bleeding valve for a bicycle hydraulic braking system comprising:

a valve body rotatably insertable in a seat of a brake caliper and comprising a first end, a second end and an axial inner cavity open on said first end, said valve body further comprising a radial duct close to said second end and in fluid communication with said axial inner cavity; said valve body comprising a head at said first end equipped with a radially outer surface configured to be engaged by a wrench;

a closing body having an end portion equipped with a head insertable in said head of the valve body; said head of the closing body comprising a blind cavity configured to be engaged by an operating tool;

the inner cavity of the valve body comprising connection members active on said closing body configured to removably hold it in the inner cavity.

The inner cavity of the valve body extends along a rectilinear axis. Such an axis is the main reference axis for the elements that form part of the bleeding valve of the present invention; all of the indications of direction and the like, such as "axial", "radial", "circumferential", "diametral" will refer to it in the present description and in the following claims. The indications "outwards" and "inwards" referring to radial directions should be interpreted as away from the axis or towards the axis.

Depending on the angular position taken up by the valve body inside the seat of the brake caliper, the radial duct of the valve body can be placed in fluid communication or in fluid isolation with a hydraulic duct of the brake caliper opening into the seat of the brake caliper. The inner cavity of the valve body and the radial duct thus make it possible, as a function of the angular position of the valve body, to place a hydraulic duct of the brake caliper in fluid communication with the outside, allowing the venting of the hydraulic system and/or the insertion of brake liquid into it.

The Applicant has found that by providing a closing body insertable inside the inner cavity of the valve body it is possible to prevent mud, water and dirt from entering into the inner cavity, when the bicycle is in use, without having to significantly increase the axial extension of the bleeding valve.

The Applicant has also found that by providing the inner cavity of the valve body with connection members active on the closing body configured to removably hold it in the inner cavity, when the closing body is removed to carry out the venting operations the connection members of the inner cavity can be used to constrain to the valve body a hydraulic fitting configured to be connected to a flexible bleeding tube.

The Applicant has found that in this way, it is possible to avoid integrating in the bleeding valve connection means with a bleeding tube, reducing the axial size of the bleeding valve.

The bleeding valve thus emerges from the caliper body to which it is substantially constrained with only the head of the valve body. The axial size of such a head is given by the sole need of allowing it to be engaged by an operating key (like for example a wrench) in order to be able to be rotated with respect to the brake caliper, and therefore it can be substantially reduced.

In this way, the bleeding valve can be installed in a position of the brake caliper that is easily reached to carry out the venting operations, without it projecting considerably from the brake caliper or being accidentally damaged during the normal use of the bicycle.

The bleeding valve for a bicycle hydraulic braking system of the present invention can comprise one or more of the following preferred features, individually or in combination.

Preferably, said connection members comprise a radially inner and threaded cylindrical wall of the valve body at least partially defining said inner cavity; said closing body comprising a first cylindrical portion equipped with a threading configured to engage the threading of said cylindrical wall.

In this way, the closing body can be quickly and easily inserted and removed from the valve body.

Preferably, said head of said valve body comprises an inlet opening of said inner cavity, said inlet opening being flared in the inner radial direction; said head of the closing body comprising a wall counter-shaped to said inlet opening to go into axial abutment against it.

In this way, as well as ensuring a mechanical abutment for the head of the closing body in the head of the valve body, the head of the closing body can at least partially penetrate inside the head of the valve body, containing the axial bulk of the bleeding valve.

Preferably, said second end of the valve body comprises a frusto-conical outer surface.

This shape allows the valve body to partially insert inside a hydraulic duct open on the seat of the brake caliper in which the bleeding valve is inserted. In this way, the valve body can act as a sealing element for such a hydraulic duct when the bicycle is in normal use condition.

Preferably, said valve body comprises a radially outer wall having a first threaded portion and, at a second axially inner portion with respect to said first portion, an annular throat for receiving an O-ring.

In this way, possible leakages of fluid between the valve body and the seat of the brake caliper are avoided.

According to a second aspect of the present invention, a hydraulic fitting for a hydraulic braking system comprises:

a first end portion equipped with a fastening lip configured to receive and hold a flexible tube;

a central portion having a radially outer surface configured to be engaged by an operating tool;

a second end portion having a threaded outer surface configured to screw into a threaded cavity of a bleeding valve;

said first end portion, central portion and second portion being crossed by an axial through hole.

The hydraulic fitting can be advantageously used, for example, in combination with the valve body of the bleeding valve according to the first aspect of the present invention.

In this way, it is possible to easily and stably connect a flexible tube to the valve body to proceed with the venting operations of the hydraulic braking system.

Preferably, the hydraulic fitting comprises an annular throat engaged by an O-ring; said annular throat being arranged between the central portion and said second end portion.

Such an O-ring, when the hydraulic fitting is connected to the valve body, avoids leakage of fluid between the inner cavity of the latter and the hydraulic fitting.

Preferably, said first end portion of the hydraulic fitting comprises a succession of wedge-shaped surfaces configured to receive and hold a flexible tube.

According to a third aspect of the present invention, a kit for a bicycle hydraulic braking system comprises:

a bleeding valve for a bicycle hydraulic braking system, in accordance with the first aspect of the present invention and a hydraulic fitting for a bleeding valve of a bicycle hydraulic braking system in accordance with the second aspect of the present invention.

BRIEF DESCRIPTION OF THE DRAWING(S)

Further features and advantages of the invention will become clearer from the following description of preferred embodiments thereof, made with reference to the attached drawings. In such drawings.

DETAILED DESCRIPTION OF THE PREFERRED EMBODIMENTS

In the present description and in the following claims, the terms "axial", "axially", "longitudinal", "longitudinally" and the like, when referring to the brake caliper, are meant to refer to a direction substantially coinciding with or substantially parallel to a rotation axis of the brake disc, which substantially coincides with a longitudinal axis of the hub, the term "axially inner" is meant to refer to an axial position closer to the hub of the wheel and the term "axially outer" is meant to refer to a position distal from the hub of the wheel; the term "radial", "radially" and the like, when referring to the brake caliper, are meant to refer to a direction that sits in a plane substantially perpendicular to the longitudinal rotation axis of the brake disc hub and that passes through such a longitudinal rotation axis of the hub.

With reference to the attached figures, a preferred embodiment of a bleeding valve for a bicycle hydraulic braking system in accordance with the present invention is shown. The bleeding valve is wholly indicated with 10.

The bleeding valve 10 comprises a valve body 11, preferably made of metallic material.

The valve body 11 comprises a head 12 arranged at a first axial end 11a intended to abut on a surface 201 of a brake caliper 200. For this purpose, the head 12 comprises an annular shoulder 13 facing towards the brake caliper 200.

The radially outer surface 14 of the head 12 is substantially prismatic so as to be able to be engaged by an operating key like for example a wrench.

At an axial end of the head 12 there is an inlet opening 15 which defines an entrance for an inner cavity 16 of the valve body 11. Such an inlet opening 15 is radially flared inwards so as to be able to define a facilitated-entry seat, as will become clearer hereinafter.

The aforementioned inner cavity 16 of the valve body 11 extends from the first axial end 11a of the valve body 11 up to a second axial end 11b thereof.

The inner cavity 16 is open at the first axial end 11a, opening out into the inlet opening 15 of the head 12 and is closed by a blind bottom at the second axial end 11b of the valve body 11.

The inner cavity 16 is defined by a first cylindrical portion 16a and by a second cylindrical portion 16b consecutive to the first 16a. The first cylindrical portion 16a is axially aligned with the second 16b and has a greater diameter than the second 16b.

The wall of the first cylindrical portion 16a is partially threaded to define connection members 17 configured to receive the threaded portion of a further component (described hereinafter) of the bleeding valve 10.

Close to the second end 11b of the valve body 11 there is a radial duct 18 that passes through the side wall of the valve body and opens into the inner cavity 16.

The radial duct 18 intercepts the inner cavity 16 at the second cylindrical portion 16b.

The radially outer side wall 19 of the valve body 11 has a threading 20 that extends axially away from the annular shoulder 13 of the head 12.

In a position comprised between the threading 20 and the radial duct 18, the valve body 11 comprises an annular throat 21 which is formed on the radially outer side wall 19.

The annular throat 21 is engaged by a hydraulic sealing O-ring 22.

The valve body 11 is inserted in a seat 202 of the brake caliper 200 which has a bottom wall in fluid connection with a hydraulic duct 203 of the hydraulic braking system.

The seat 202 is counter-shaped to the radially outer side wall 19 of the valve body 11. The second axial end 11b of the valve body is externally frusto-conical, so that it can partially insert into the hydraulic duct 203 of the brake caliper 200 and sealably close it.

The seat 202 comprises a threading 204 configured to couple with the threading 20 of the valve body 11, so that the latter can be screwed into the seat 202.

Concerning this, as stated above, the prismatic radially outer surface 14 of the head 12 allows the engagement with an operating key to facilitate the coupling of the valve body 11 inside the seat 202.

Figure 1:
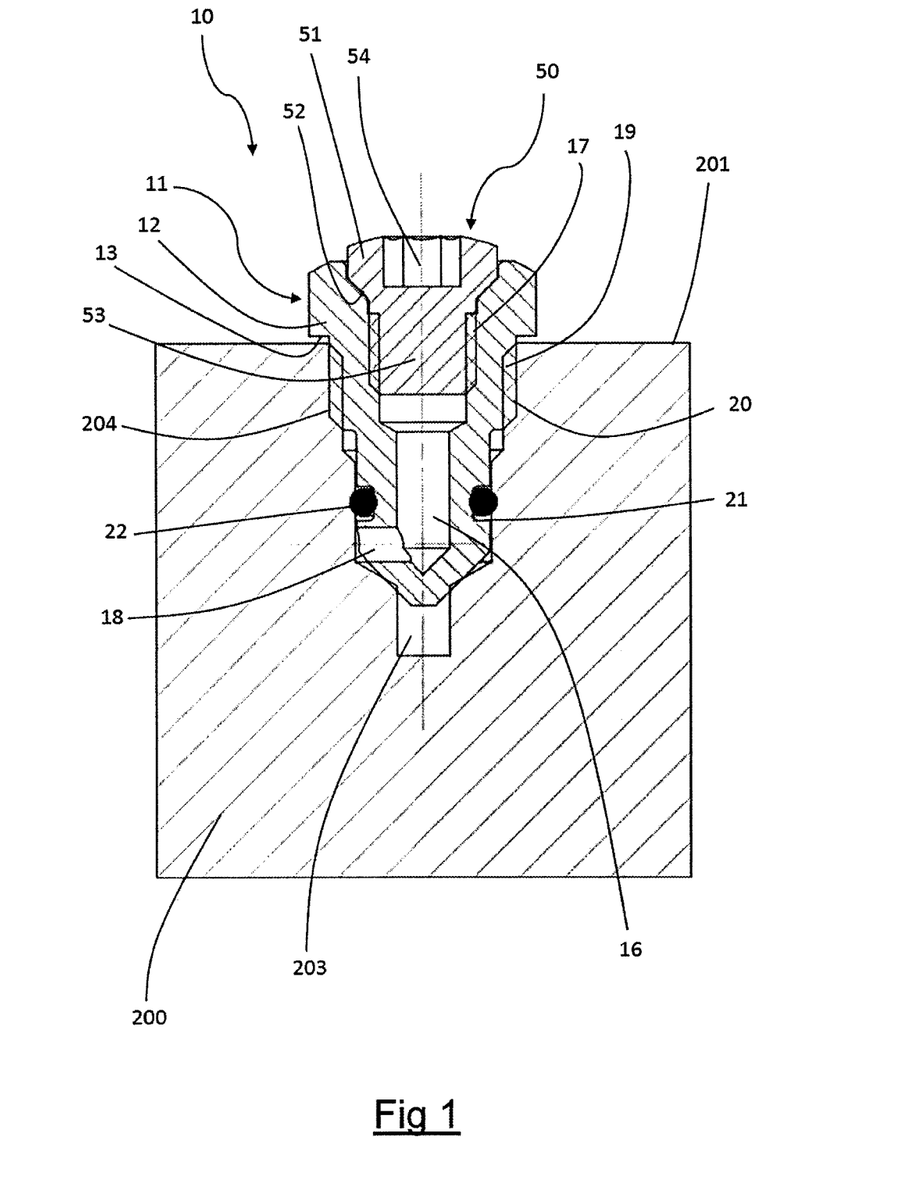
FIG. 1 is a section view of a bleeding valve for a bicycle hydraulic braking system according to the invention.
Figure 2:
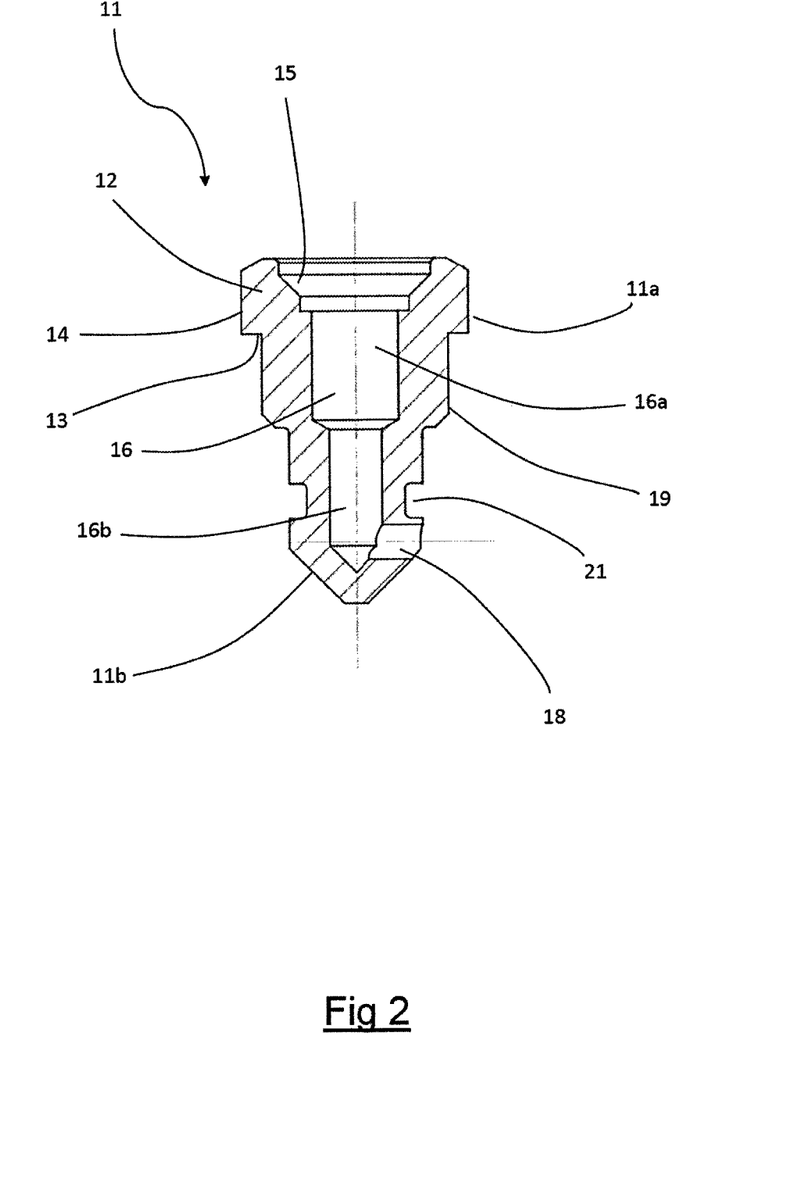
FIG. 2 is a section view of a detail of the bleeding valve of FIG. 1.

When the valve body 11 is completely screwed inside the seat 202, the annular shoulder 13 of the head 12 is brought as far as possible towards the wall 201 of the brake caliper (as illustrated in FIG. 1).

In this configuration, the second end 11b of the valve body 11 blocks the hydraulic duct 203 on the bottom of the seat 202 of the brake caliper 200, preventing brake liquid and/or air from being able to come out from the hydraulic duct 203.

By rotating the valve body 11 inside the seat 202 in the opposite direction to the screwing direction, the second end 11b of the valve body 11 lifts up, moving away from the bottom of the seat 202 and opening a fluid passage between the hydraulic duct 203 and the seat 202 itself.

The brake liquid and/or the air in the braking system flows, through the radial duct 18 of the valve body 11 in the inner cavity 16 of the latter, being able to reach the inlet opening 15 of the head 12 and thus the outside.

In this configuration, the O-ring 22 prevents brake liquid and/or air from being able to leak between the seat 202 and the radially outer side wall 19 of the valve body 11.

This configuration is adapted for performing the air venting and/or brake liquid insertion operations in the system, as will be described more clearly hereinafter.

In order to prevent water, mud or dirt from being able to slip into the inner cavity 16 when the bicycle is in use, the bleeding valve 10 comprises a closing body 50 for the valve body 11.

The closing body 50, illustrated in FIG. 1 coupled with the valve body 11, comprises a head 51 arranged at an end portion 50a.

The head 51 of the closing body 50 has a radially outer surface 52 flared in the radially inner direction counter-shaped to the flaring of the inlet opening 15 of the valve body 11, so that the head 51 of the closing body can be inserted in the head 12 of the valve body 11.

The closing body 50 comprises a cylindrical portion 53 that extends from the head 51 and axially away from it. The cylindrical portion 53 is externally threaded to screw onto the threading of the first cylindrical portion 16a of the inner cavity 16 of the valve body 11.

As illustrated in FIG. 1, the head 51 of the closing body 50 comprises a blind cavity 54 configured to be engaged by an operating tool, for example an Allen key, so as to be able to be screwed and unscrewed in the valve body 11. The closing body is preferably made of metallic material.

In the example illustrated in FIG. 1, the head 51 of the closing body 50 has an axial extension, in other words it is separated from the surface 201 of the brake caliper 200, slightly more than the axial extension of the head 12 of the valve body 11. In other embodiments that are not illustrated, the head 51 of the closing body 50 has an axial extension equal to or less than the axial extension of the head 12 of the valve body 11.

In any case, the axial extension of the head 51 of the closing body 50 is less than the axial extension of the head 12 of the valve body 11 multiplied by a factor 1.5.

Figure 3:
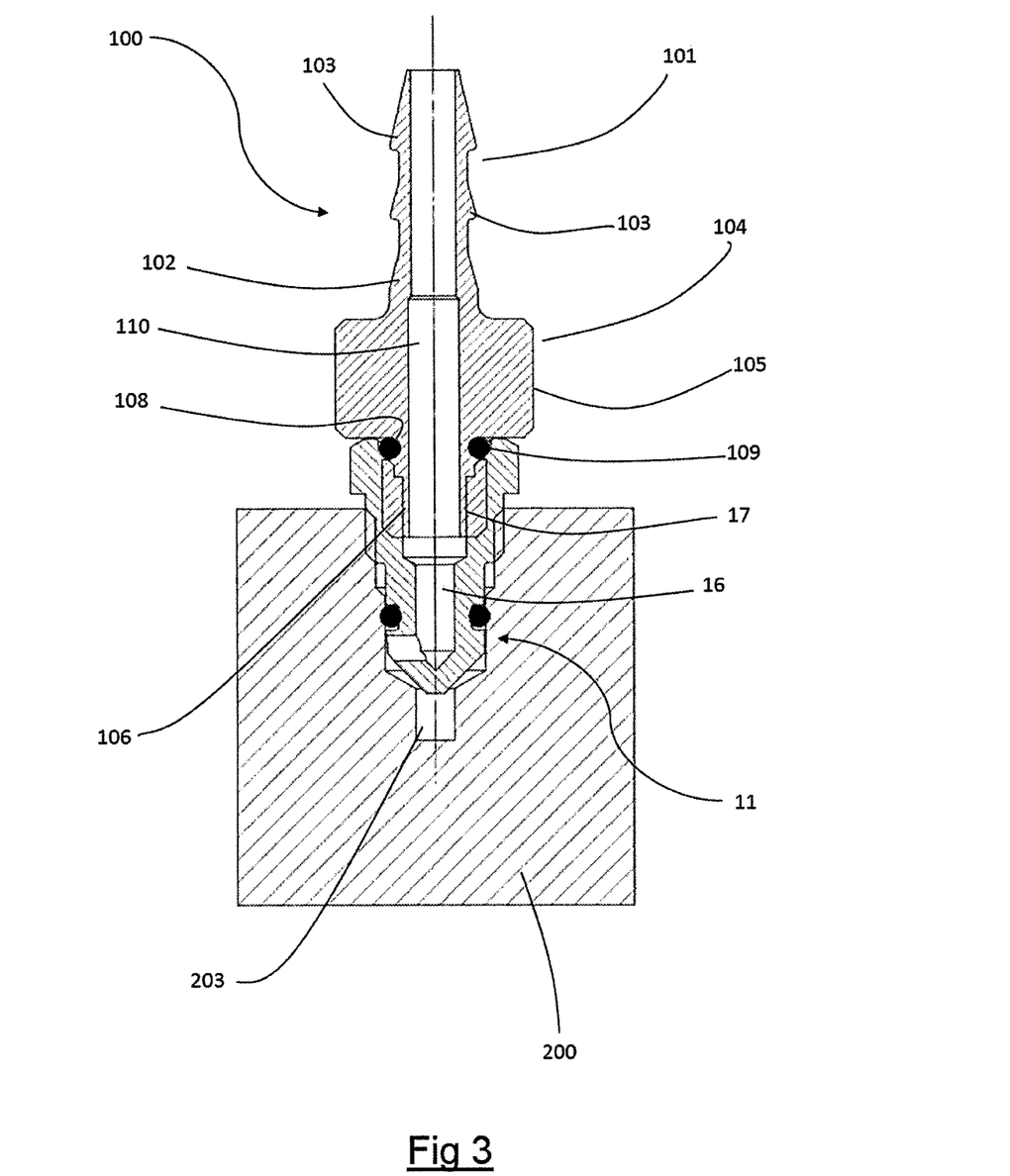
FIG. 3 is a section view of the bleeding valve of FIG. 1 connected to a hydraulic fitting in an assemble according to the invention.

FIG. 3 shows the valve body 11 in venting configuration, in other words in a configuration adapted for expelling air from the hydraulic braking system and/or for inserting brake liquid inside it.

The valve body 11 has a hydraulic fitting 100 applied to it, which has the function of placing a flexible tube in fluid communication with the valve body 11 and of mechanically constraining them.

Indeed, it should be noted that the valve body 11 does not integrate any lip or other device configured to allow a stable and reliable connection to a free end of a flexible tube.

The hydraulic fitting 100 comprises a first end portion 101 which integrates a lip 102 configured to fasten and hold the free end of a flexible tube (not shown).

For this purpose, the lip 102 comprises a plurality of wedge-shaped annular projections 103 that are consecutive and axially aligned. In the embodiment illustrated in FIG. 3, there are two wedge-shaped annular projections 103.

Axially adjacent to the first end portion 101, the fitting 100 comprises a central portion 104 projecting radially outside with respect to the first end 101.

The central portion 104 has a radially outer surface 105 with a prismatic shape so as to be able to be engaged by an operating tool like for example a wrench.

Axially adjacent to the central portion 104, the fitting 100 comprises a second end portion 106.

The second end portion 106 has a radially outer surface 107 that is threaded and of radial extension such as to be able to screw into the threaded portion 17 of the inner cavity 16 of the valve body 11.

Between the central portion 104 and the second end 106, the radially outer surface of the fitting 100 comprises an annular throat 108 engaged by a sealing O-ring 109.

The fitting 100 is crossed by an axial hole 110.

The bleeding valve 10 and the fitting 100 make a kit that makes it possible to carry out the venting operations of the hydraulic braking system.

Figure 4:
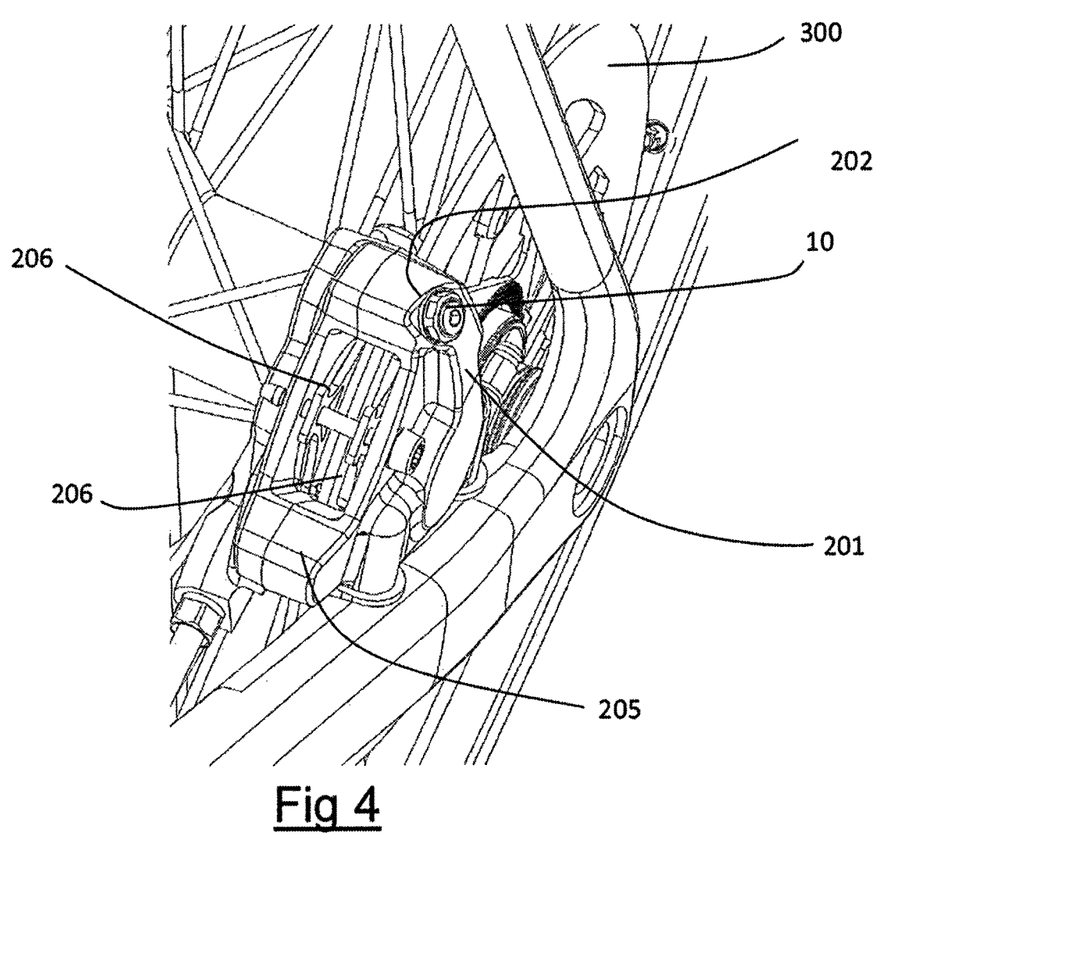
FIGS. 4 and 5 are perspective views of just the bleeding valve of FIG. 1 applied to a brake caliper.
Figure 5:
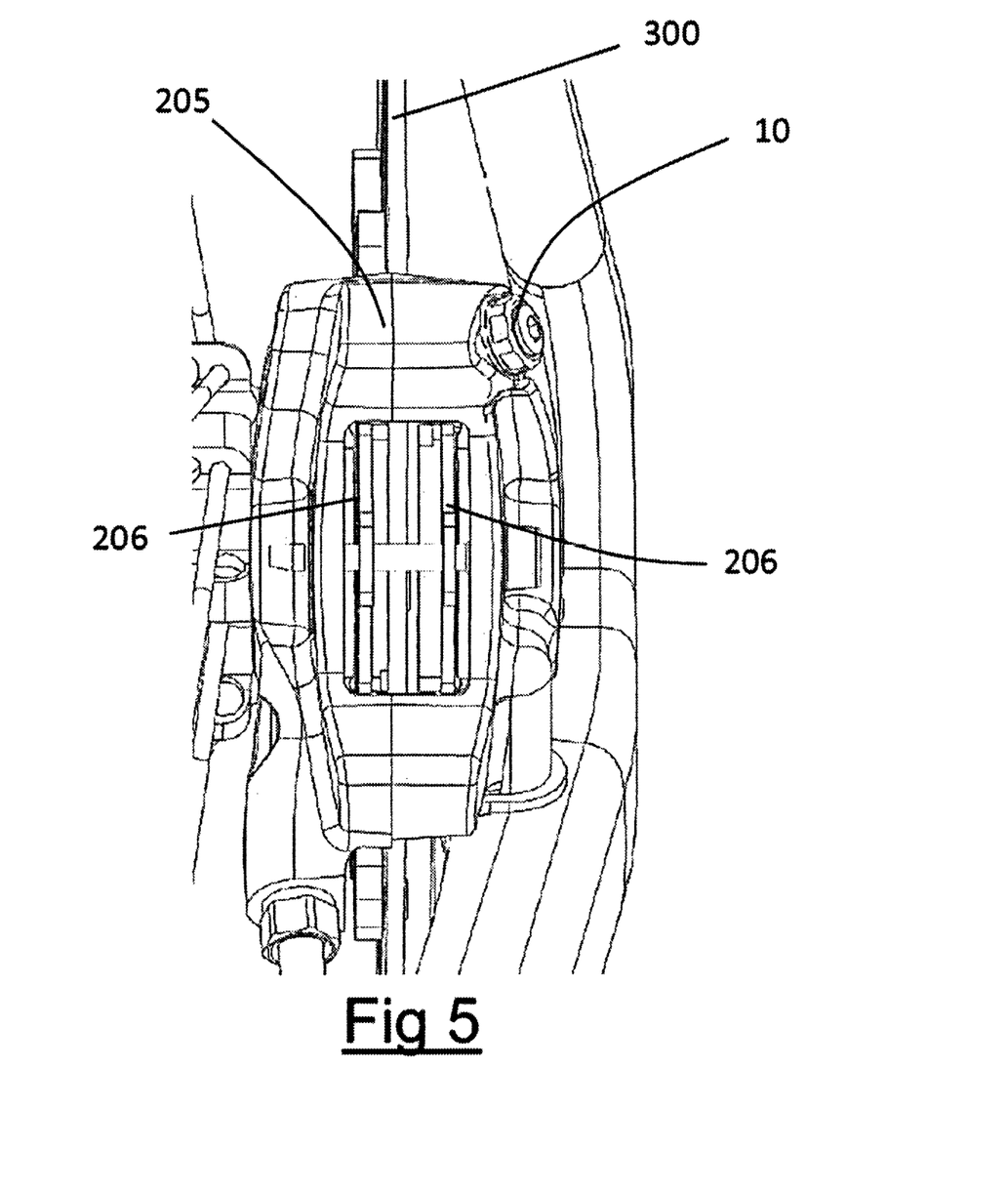

FIGS. 4 and 5 show the bleeding valve 10 mounted on a brake caliper 200 of the rear wheel of a bicycle, even if the following also applies identically to the brake caliper of a front wheel.

The brake caliper 200 comprises a caliper body 205 that houses two opposite brake pads 206 that face opposite surfaces of a brake disc 300.

Inside the caliper body 205 two or more pistons are arranged (not illustrated) which act on the brake pads 206 to actuate them against the surfaces of the brake disc. The pistons are in fluid connection with the hydraulic braking system and in particular with a main cylinder configured to put the brake liquid under pressure when the cyclist actuates a brake lever arranged on the handlebars of the bicycle.

The seat 202 of the brake caliper configured to receive the bleeding valve 10 is arranged on a surface 201 of the caliper body 205 that is distal with respect to the wheel of the bicycle, as illustrated in FIGS. 4 and 5.

In particular, the seat 202 is arranged on an axially outer surface 201 of the caliper body 205, in other words a surface facing the opposite way to the surface facing the wheel of the bicycle.

Preferably, the bleeding valve 10 is hydraulically arranged between two pistons of the brake caliper 200, in other words upstream of a piston and downstream of another piston.

In use, when venting operations do not need to be carried out the valve body 11 is completely screwed into the seat 202 and the closing body 50 is screwed into the inner cavity 16 of the valve body 11, as illustrated in FIG. 1.

When it is necessary to carry out venting operations of the hydraulic braking system, the closing body 50 is removed from the valve body 11.

The fitting 100 is then associated with the valve body 11 by screwing the threaded radially outer surface 107 of the second end 106 in the threaded portion 17 of the inner cavity 16 of the valve body 11.

In this way, the inner cavity 16 of the valve body 11 is in fluid communication with the axial hole 110 of the fitting 100. The O-ring 109 of the fitting 100 is in contact with the flared part of the inlet opening 15 of the head 12 of the valve body 11, avoiding possible leaking of fluid between the fitting 100 and the valve body 11.

The valve body 11 is then rotated inside the seat 202 of the brake caliper so that the hydraulic duct 203 of the brake caliper is in fluid communication with the radial duct 18 and the inner cavity 16 of the valve body 11, as illustrated in FIG. 3. The extent of the rotation of the valve body with respect to the seat 202 is such as to at least partially extract the frusto-conical outer surface of the second end 11b of the valve body from the hydraulic duct 203, so as to open a leaking opening between second end 11b and bottom of the seat 202. Such an extent of the rotation can for example be a rotation by 180°.

At this point it is possible to carry out the venting operations, such as elimination of the air present in the hydraulic braking circuit, and insertion of brake liquids therein, in a conventional manner.

Of course, those skilled in the art can make numerous modifications and variants to the invention described above, in order to satisfy specific and contingent requirements, like for example by foreseeing a bayonet coupling between closing body and valve body, all in any case encompassed by the scope of protection of the present invention as defined by the following claims.

What is claimed is:

1. A bicycle hydraulic brake system bleeding valve comprising:
   a valve body that has a radially outer wall having a first threaded portion and, at a second axially inner portion with respect to said first portion, an annular throat for receiving an O-ring and is rotatably insertable in a seat of a brake caliper and comprising a first end, a second end and an axial inner cavity open on said first end, said valve body further comprising a radial duct close to said second end and in fluid communication with said axial inner cavity; said valve body comprising a head at said first end equipped with a radially outer surface configured to be engaged by a wrench;
   a closing body having an end portion equipped with a head insertable in said head of the valve body; said head of the closing body comprising a blind cavity configured to be engaged by an operating tool; and,
   the inner cavity of the valve body includes connection members configured to mate with connection members on said closing body and hold said closing body in the inner cavity.

2. The bleeding valve according to claim 1, wherein said connection members comprise a radially inner and threaded cylindrical wall of the valve body at least partially defining said inner cavity; said closing body comprising a cylindrical portion equipped with a radially outer threading configured to engage the threading of said cylindrical wall.

3. The bleeding valve according to claim 1, wherein said head of said valve body comprises an inlet opening of said inner cavity, said inlet opening being flared in an inner radial direction; said head of the closing body comprising a wall counter-shaped to said inlet opening to go into axial abutment against it.

4. The bleeding valve according to claim 1, wherein said second end of the valve body comprises a frusto-conical outer surface.

5. A hydraulic braking system bleeding valve comprising:
   a valve body rotatably insertable in a seat of a brake caliper and comprising a first end, a second end and an axial inner cavity open on said first end, said valve body further comprising a radial duct close to said second end and in fluid communication with said axial inner cavity; said valve body comprising a head at said first end equipped with a radially outer surface configured to be engaged by a wrench, and a radially outer wall having a first threaded portion and, at a second axially inner portion an annular throat for receiving an O-ring;

a closing body having an end portion equipped with a head insertable in said head of the valve body; said head of the closing body comprising a blind cavity configured to be engaged by an operating tool;

the inner cavity of the valve body includes threads configured to mate with threads on said closing body and hold said closing body in the inner cavity.

\* \* \* \* \*